Figure 3:
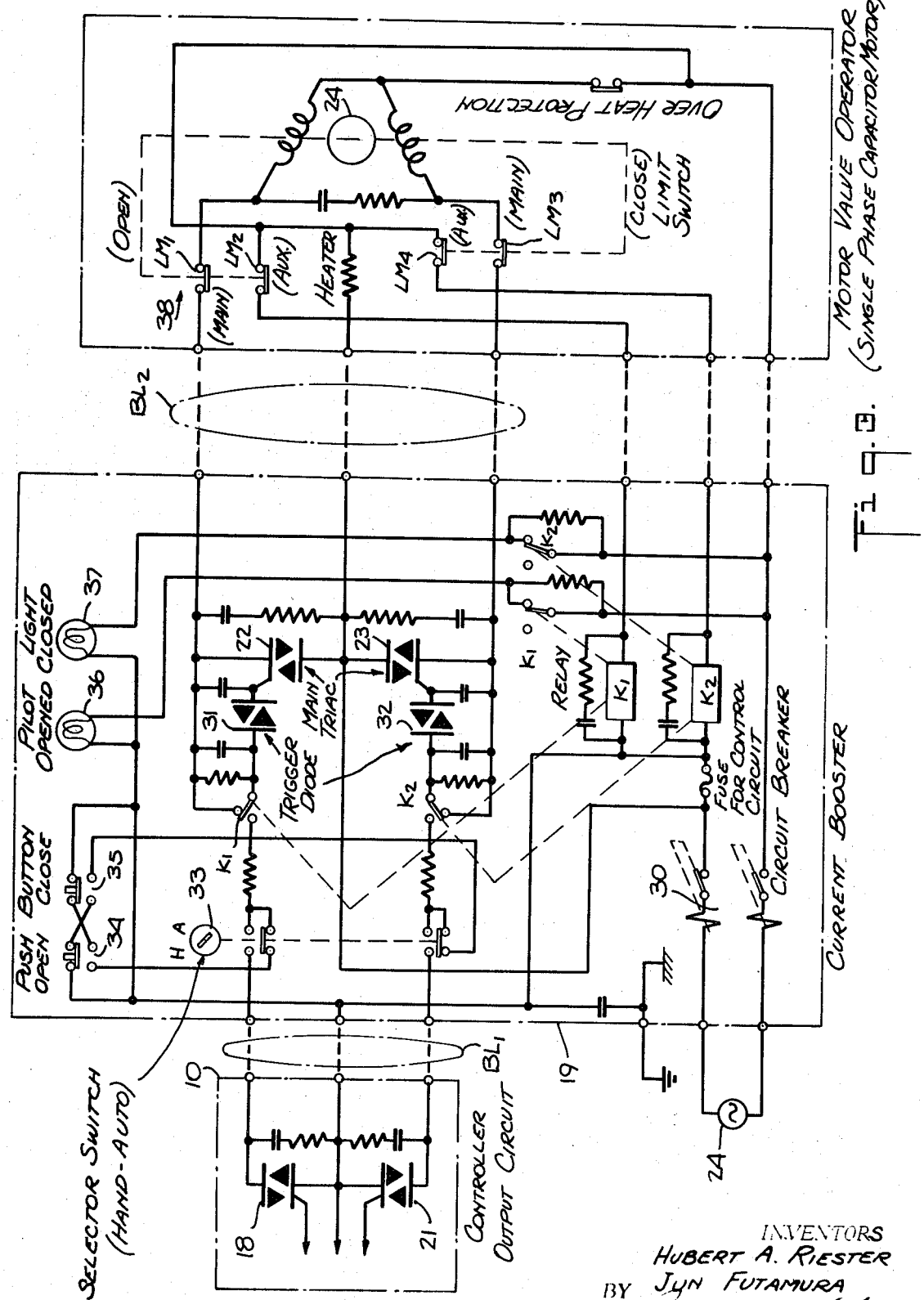

United States Patent
Riester et al.

[15] 3,688,176
[45] Aug. 29, 1972

[54] ELECTRONIC PROCESS CONTROLLER INCLUDING CURRENT BOOSTER TO OPERATE HEAVY-DUTY MOTORIZED VALVE

[72] Inventors: Hubert A. Riester, Huntingdon Valley; Jun Futamura, Hatboro, both of Pa.

[73] Assignee: Fischer & Porter Company, Warminster, Pa.

[22] Filed: Jan. 6, 1971

[21] Appl. No.: 104,440

[52] U.S. Cl..............318/609, 318/293, 307/252 B
[51] Int. Cl..............................................G05b 11/36
[58] Field of Search......318/681, 591, 626, 609, 610, 318/227, 207, 293; 307/130, 140, 252 B; 317/123

[56] References Cited

UNITED STATES PATENTS

| | | | |
|---|---|---|---|
| 3,551,770 | 12/1970 | Isaacs | 318/681 X |
| 3,553,560 | 1/1971 | Lemen | 318/681 |
| 3,549,976 | 12/1970 | DeBretagne | 318/591 |
| 3,394,292 | 7/1968 | Flum | 318/626 |

Primary Examiner—Benjamin Dobeck
Attorney—Michael Ebert

[57] ABSTRACT

A process-control system which includes a contact-output electronic controller adapted to compare a process variable signal (PV) with a set point signal (SP) to produce a first on-off output signal when PV is below SP and a second on-off output signal when PV is above SP. The controller output signals are delivered to a booster provided with a pair of heavy-duty triac control circuits coupled to a reversible motor which drives a final control element, the output signals driving the triacs to cause the motor to turn in a direction and to an extent causing the final control element to vary the process variable to bring it into line with the set point.

9 Claims, 3 Drawing Figures

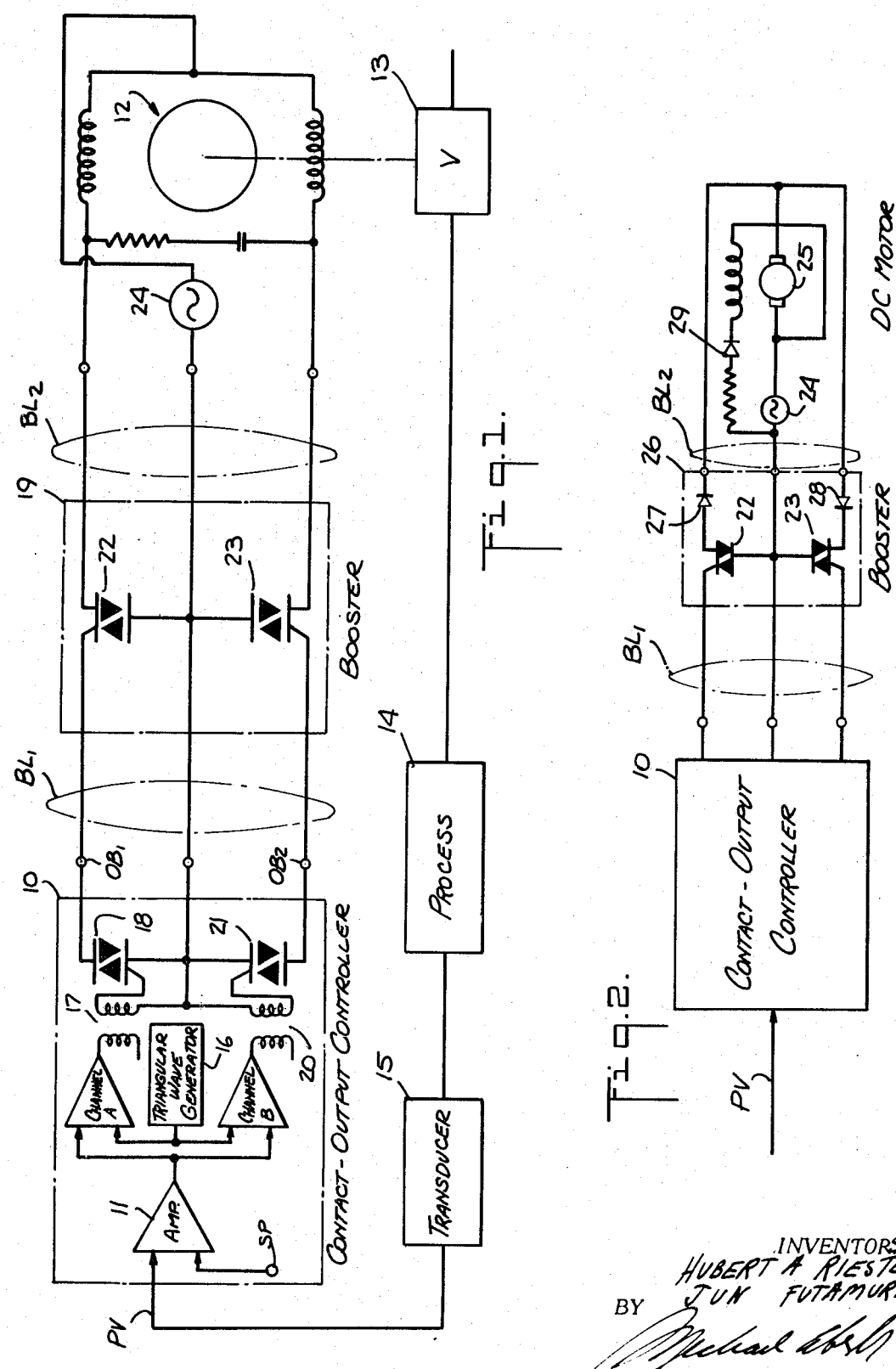

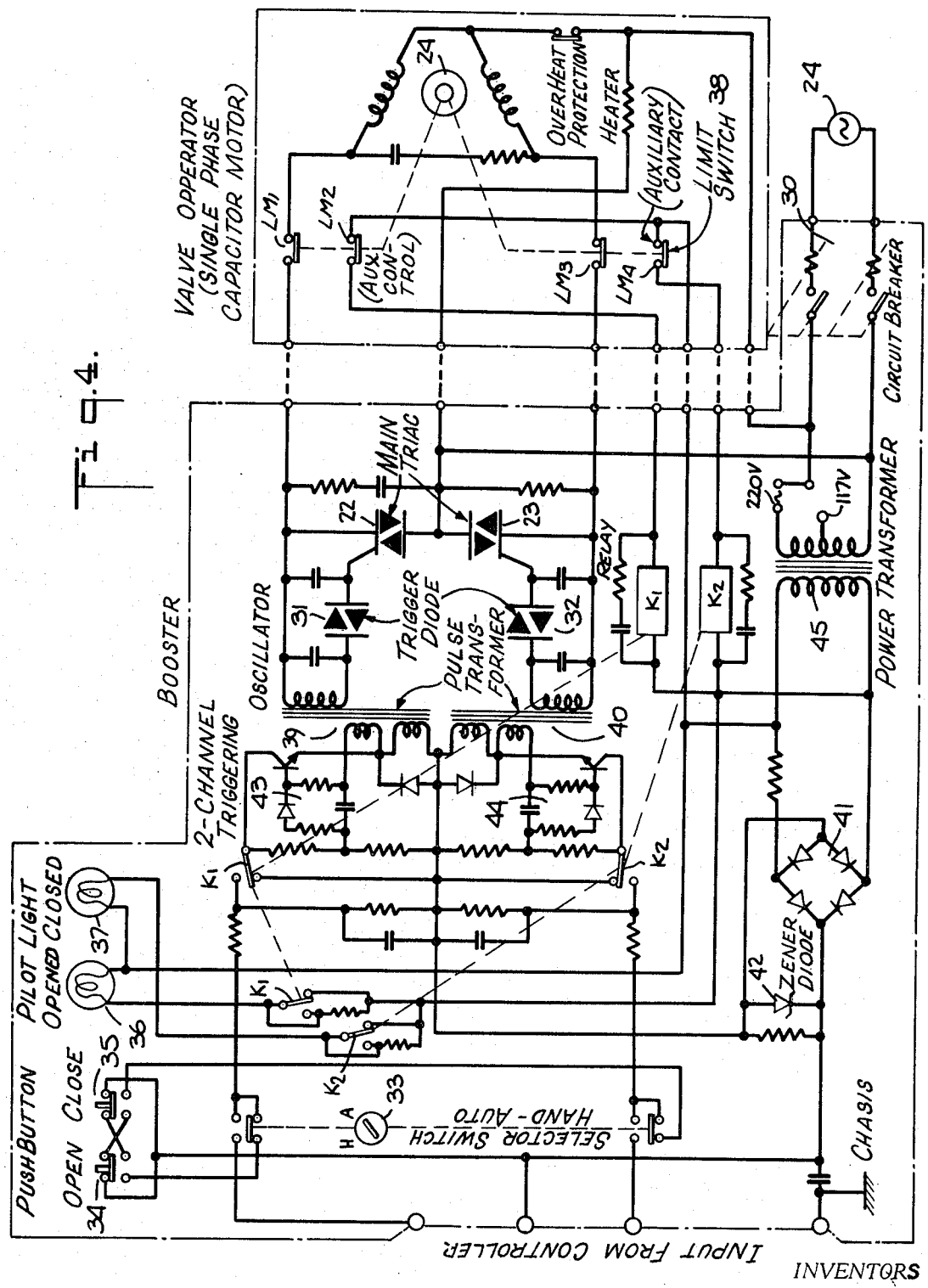

3,688,176

ELECTRONIC PROCESS CONTROLLER INCLUDING CURRENT BOOSTER TO OPERATE HEAVY-DUTY MOTORIZED VALVE

RELATED APPLICATION

This application is related to the copending application of John Futamura, serial No. 67,021, filed Aug. 26, 1970, entitled FLOATING-TYPE ELECTRONIC PROCESS CONTROLLER.

BACKGROUND OF THE INVENTION

This invention relates generally to electronic controllers for process control loops, and more particularly to a contact-output controller adapted to accept a process signal and to convert it to on-off signals for manipulating the speed and direction of a heavy-duty motor driving a final control element.

An electronic controller is a component in a process control loop which is subject to disturbances, the controller acting in conjunction with other devices to maintain a process variable at a desired value. To accomplish this purpose, the controller receives, in terms of electrical values, both the desired or set point value, and the process variable, the controller functioning to operate a final control element which directly or indirectly governs the process variable.

The factor controlled may be flow rate, pressure, viscosity, liquid level, or any other process variable. Thus the output signal of the controller may be derived from a rate-of-flow meter whose reading is translated into a corresponding electrical value. The output of the controller may be impressed on a motor-driven, flow-regulating valve, which valve is opened or closed or is caused to assume an intermediate position as determined by the controller.

The specific nature of the process variable and the final control element is not the concern of the present invention, which is applicable to all forms thereof operable by a reversible motor. However, the primary concern of the present invention is with final control elements operated by heavy-duty reversible motors which draw large currents.

In the above-identified copending patent application, there is disclosed a contact-output electronic controller that accepts a process signal and converts it to on-off signals to manipulate a reversible motor for controlling a final control element. The control circuit for the reversible motor includes a pair of triacs which are switched into operation by on-off signals derived from the controller, whereby the activation of one triac causes the motor to turn in one direction, and the activation of the other triac causes the motor to turn in the reverse direction.

Among the significant advantages of the invention disclosed in said copending application are that no final control element valve-position transmitter is required, for the system needs no position feedback, and that the valve position is maintained should power fail.

In the contact-output electronic controller disclosed in said copending application, a differential amplifier is adapted to sense the deviation of the process variable from the set point to produce a deviation signal. This is converted into on-off signals by applying the deviation signal to a pair of comparator channels to which are also applied a triangular-wave reference voltage having a constant frequency. When the process variable is below the set point, one channel is activated to yield square-wave pulses whose rate corresponds to the reference frequency and whose duration is proportional to the magnitude of the deviation signal and hence to the extent to which the process variable deviates from the set point. When the deviation signal reflects a process variable which is above the set point, the other channel is activated to provide similar square-wave pulses.

The square-wave pulses produced by the channels are applied to the triac control circuit of a reversible motor operatively coupled to a final control element. The pulses from one channel effect motor operation in one direction with a duty cycle determined by the pulse duration, and the pulses from the other channel similarly effect motor operation in the reverse direction whereby the final control element varies the process variable in a direction and to an extent bringing it into line with the set point.

The controller described in said copending application is capable of directly manipulating a light-duty motorized valve having, say, a one-ampere rating. But in modern industrial process-control systems, it is sometimes necessary to make use of motorized valves having considerably higher power requirements.

While it is possible to design a controller of the type disclosed in said copending application to directly control heavy-duty motorized valves, an arrangement of this type has certain practical drawbacks, for if the motorized valve is to be located at a point quite remote from the controller, which is often the case, then the lines conveying a heavy current or high voltage from the controller to the motorized valve may be extended to a point where losses encountered in the line are substantial and impair the operation of the system.

SUMMARY OF THE INVENTION

In view of the foregoing, it is the main object of this invention to provide, in conjunction with a contact-output electronic controller, a current-booster making it possible for the controller to efficiently operate a heavy-duty reversible motor, particularly when the motor is located at a position remote from the controller.

One significant advantage of an arrangement in accordance with the invention is that small motorized valves can be driven directly from the contact-output controller itself, whereas large valves are driven indirectly through the booster. Inasmuch as motorized control valves in present use to satisfy specific requirements range from ¼ inch to 50 inches or more in diameter, with the present system it becomes possible to operate whatever reversible motor is called for by the system, regardless of voltage and current limitations.

More specifically, it is an object of this invention to provide a contact-output electronic controller capable of operating three types of reversible motors; namely:

1. small AC motors (120V) whose current is one ampere or less, such as a shaded-pole-type induction motor or a small capacitor, split-phase induction motor, 2. large AC motors (240V) whose current rating is over one ampere, up to several amperes (i.e., 5 amp.), and 3. DC motors.

In the case of small AC motors, the contact-output controller drives these directly, but for large AC motors and DC motors, an interface is provided in the form of a solid-state current booster.

Briefly stated, a process-control system in accordance with the invention includes a contact-output electronic controller wherein a process variable signal PV is compared with a set point signal SP to produce a first output signal $OB_1$ when PV is below SP, and a second output signal $OB_2$ when PV is above SP, no output being yielded when PV is equal to SP. The output signals are in the form of duration-modulated, periodic switching actions reflecting the extent of the deviation of PV from SP.

The output signals $OB_1$ and $OB_2$ are applied to a booster including a pair of heavy-duty triac control circuits, the respective signals serving to fire the triacs which are coupled to a reversible motor for driving a final control element, whereby firing of one triac causes the motor to turn in one direction, and firing of the other triac causes the motor to turn in the opposite direction, the duty cycle of the motor being determined by the duration of the firing signals.

OUTLINE OF THE DRAWING

For a better understanding of the invention as well as other objects and further features thereof, reference is made to the following detailed description to be read in conjunction with the accompanying drawing, wherein:

FIG. 1 is a simplified block diagram showing a process-control system including a contact-output electronic controller operating in conjunction with a booster in accordance with the invention to control a motorized valve forming a final control element in the system;

FIG. 2 schematically illustrates in simplified form a booster in accordance with the invention for controlling a reversible DC motor;

FIG. 3 is a schematic circuit diagram of one preferred embodiment of a current booster in accordance with the invention; and FIG. 4 is a schematic circuit diagram of another embodiment of the current booster.

DESCRIPTION OF THE INVENTION

Referring now to FIG. 1, there is shown in simplified form a floating-type electronic process controller of the type disclosed in said copending application, operating in conjunction with a current booster in accordance with the invention. The electronic controller, generally designated by numeral 10, includes a main amplifier 11 which receives, in terms of electrical analog values, both a signal voltage PV which is a function of the process variable, and a set point voltage SP, the controller functioning, by way of a current booster 19, to operate a heavy-duty reversible electric motor 12 driving a final control element 13 in the form of a valve which governs the process 14.

Main amplifier 11 is a solid-state differential amplifier. Applied to the negative input terminal thereof is an electrical signal (i.e., 1 to 5 volts DC) derived from a transducer 15 or other means, sensing the process variable of interest, which signal is proportional to the process variable PV being sensed. Applied to the positive input terminal of main amplifier 11 is a set point signal SP.

The output of main amplifier 11 is a function of the deviation between the set point and process variable input values with respect to a floating reference level. Thus amplifier 11 acts as a deviation detector which senses the departure of the process variable from the set point. This deviation voltage is converted into an on-off signal by a two-channel comparator constituted by channel stages A and B operating in conjunction with a triangular-wave reference generator 16.

When the process variable deviates in a given direction from the set point to produce a control voltage in the output of amplifier 11, this voltage is applied to both comparator channels in combination with the triangular-wave reference voltage, thereby activating comparator channel A to produce square-wave output pulses at a rate determined by the frequency of the triangular-wave reference voltage, the duration of the square-wave pulses being a function of the magnitude of the control voltage.

Similarly, when the process variable deviates from the set point in the reverse direction, comparator channel B is activated to produce square-wave output pulses whose duration is a function of the magnitude of the control voltage. Square-wave pulses from channel A are fed to a trigger oscillator circuit (not shown), coupled by a transformer 17 to a triac 18 which is arranged to control the supply of AC power to reversible motor 12 by way of booster 19 to cause the motor to turn in one direction and to thereby open (or close) the final control element.

Square-wave pulses from channel B are fed to a trigger oscillator circuit (not shown) which is coupled by a transformer 20 to a triac 21 arranged to control the supply of AC power to motor 12 by way of booster 19 to cause it to turn in the opposite direction and to thereby close (or open) the final control element. Triacs are three-terminal semiconductor switches for AC power which may be triggered into conduction in either direction by a gate current in either polarity.

Thus triacs 18 and 21 act as electronic contacts, and since they are fired by duration-modulated, periodic square-wave pulses derived respectively from channels A and B, output signals $OB_1$ and $OB_2$ yielded by these triacs are in the form of duration-modulated, periodic switching actions reflecting the direction and extent of the deviation of PV from SP. No output is produced when these values are equal.

Triacs 18 and 21 in the electronic controller 10 are capable of directly controlling a reversible AC motor whose power rating is within the handling capacity of these triacs, which is the fractional ampere range whose upper limit is 1 ampere. While the direct handling capacity of the electronic controller may be enlarged by shunting additional triacs across triacs 18 and 21, this is not desirable, for when a heavy-duty motor to be controlled is located at a relatively remote position, extended lines thereto are required to carry a large current, with consequent power losses.

In order, therefore, to render the system capable of controlling large as well as small reversible motors, booster 19 is provided which is a self-contained unit that may be placed at any convenient position adjacent the heavy-duty motor to be controlled. The booster is linked by extended lines $BL_1$ to the output of controller 10. These long lines are required to carry only relatively light current.

Booster 19, which is shown in greatly simplified form in FIG. 2, is provided with a pair of triac control circuits including high-current-rating triacs 22 and 23 so coupled by short lines $BL_2$ to reversible motor 12 as to cause the motor to turn in one direction when triac 22 is conductive, and in the reverse direction when triac 23 is conductive.

Lines $BL_2$ are heavy-duty lines capable of carrying the heavy currents drawn from an AC power source 24 without line losses. The output signals $OB_1$ from triac 18 in the controller serve to fire booster triac 22, while output signal OB from controller triac 21 serves to fire booster triac 23, whereby motor 12 governs the position of the final control element valve 13 to bring PV in line with SP.

It will be seen, therefore, that motor 12 is supplied with periodic pulses of AC power, the periodicity of which is determined by the frequency of the triangular-wave reference voltage in controller 10. These power pulses are modulated in width as a function of the detected deviation in the process variable PV. Thus the duty cycle of the motor varies as a function of the deviation; the greater the deviation, the longer the power pulses.

In practice, therefore, when a light-duty reversible AC motor is to be controlled, the motor may be coupled directly to the output of the controller, but when a heavy-duty AC motor is involved, the booster is used as an interface between the controller and motor.

In the arrangement shown in FIG. 2 for controlling a DC motor 25, the electronic controller 10 is the same as with AC motor control, but booster 26 in this instance includes rectifying diodes 27 and 28 in the outputs of triacs 22 and 23, respectively. In the circuit of DC motor 25, a diode 29 is included to rectify the AC power supplied thereto by source 24.

Referring now to FIG. 3, there is shown the schematic circuit diagram of a practical embodiment of a booster 19, operating on the principles described in connection with FIG. 1 and including main triacs or bi-directional thyristors 22 and 23 for controlling a single-phase, capacitor motor, powered by AC source 24 through a circuit-breaker 30.

The output signals from controller triacs 18 and 21 are applied by extended lines $BL_1$ to trigger diodes 31 and 32 which are arranged to fire main triacs 22 and 23 in the booster. In operation, the on-state conduction current of controller triac 18 flows through trigger diode 31 and the gate of main triac 22 and turns it "on." This current is supplied from the voltage across the main triac 22 itself, so that current must flow until the main triac turns on and ceases thereafter. Thus the triggering will be made certain and the gate will be protected from excessive power consumption. A similar relationship exists as between controller triac 21, triggering diode 32 and main triac 23 in the booster. Trigger diodes 31 and 32 act as bidirectional threshold devices and prevent the main triacs from accidentally turning on because of noise currents in the gate circuit.

A selector switch 33 is provided to make possible either manual or automatic control. When switch 33 is on its manual or hand-operation setting H, the motor may be caused to open or close by means of push-button switches 34 and 35, but when the selector switch is set to A, the system is under the automatic control of electronic controller 10.

Relays $K_1$ and $K_2$ are used for actuating pilot lights 36 and 37. Pilot light 36 goes on when the relay $K_1$ is de-energized, pilot light 37 going on when the relay $K_2$ is de-energized. These relays are operated by a limit switch 38 built into the motor 24 for operating the final control element.

Relays $K_1$ and $K_2$ are actuated by auxiliary contacts $LM_2$ and $LM_4$, the former being opened when the motor reaches the limit of the open position and the latter being opened when the motor reaches the limit of the closed position. The main contacts $LM_1$ (open) and $LM_3$ (closed) are reserved to protect the motor when the booster circuit fails. The limit switches are adjusted so that auxiliary contacts $LM_2$ and $LM_4$ open before main contacts $LM_1$ and $LM_3$ open to avoid the heavy current interruption produced by slowly moving mechanical contacts.

The arrangement shown in FIG. 3 is suitable for control of a 117-volt, 10-ampere unit motor. For a heavier-duty motor (220 volts, 25 amperes), the booster shown in FIG. 4 is appropriate.

In FIG. 4, a pair of pulse transformers 39 and 40 are employed for isolation of the input circuit. The output circuit of the controller is excited by a 24-volt intermittent DC voltage produced by a full-wave rectifier 41 and a zener diode 42.

In the case of a higher-voltage-rated motor than the rated operating voltage of the associated controller, it is usually necessary to isolate the booster input circuit from its output circuit and to operate the input circuit with a low voltage not exceeding the rated maximum operating voltage of the combined controller. This calls for a transformer to produce the required low voltage. Pulse transformers 39 and 40 act to couple the main triacs operated by a higher voltage with the input circuit operated by a lower voltage.

The applied voltage to the controller's output triac of the combined controller need not be necessarily at rated maximum. Practically it can be about 20V to permit several thousand feet transmission of the contact signal and still have a low enough voltage from the safety standpoint. AC voltage is not necessary to operate the controller's output circuit. However, the current must drop to under the minimum holding current of the triac to turn off. Hence the use of DC intermittent voltage for this purpose is merely an engineering choice.

A blocking or triggering circuit 43 is interposed between the first signal circuit from the controller and the trigger diode 31 for main booster triac 22. A like blocking oscillator 44 is interposed between the second signal circuit from the controller and trigger diode 32 for booster triac 23. The output pulses from the blocking oscillators are applied to the trigger diodes through the tertiary windings of pulse transformers 39 and 40.

The same unit can also be used with a 117-volt rather than a 220-volt line. This is accomplished by transformer 45 which applies the AC voltage from source 24 to bridge rectifier 41 and includes a centertapped primary winding. By switching the AC power input to the center tap rather than to the end of the primary, the voltage is reduced by half. The advantage of this application is insulated low-voltage excitation of the controller.

While there have been shown several embodiments of electronic process controller including current booster to operate heavy-duty motorized valve in accordance with the invention, it will be appreciated that many changes and modifications may be made therein without, however, departing from the spirit thereof.

We claim:

1. A process control system having means to detect a process variable to produce a process-variable signal PV and provided with a final control element operated by a heavy-duty reversible motor to adjust the final control element in a direction and to an extent varying PV to bring it in accord with a set-point signal SP, the system further comprising:
   A. a contact-output electronic controller remote from said motor for comparing PV and SP to produce a first on-off output signal when PV is less than SP and a second on-off output signal when PV is greater than SP, said output signals being in the form of duration-modulated periodic switching actions proportional to the extent of the deviation of PV from SP,
   B. a current booster adjacent said motor, coupled by long light-duty lines to the output of said controller and including a pair of heavy-duty main triacs, the first of which is fired by said first output signal and the second of which is fired by said second output signal, and
   C. means including relatively short heavy duty lines connecting said main triacs to said reversible motor to cause said motor to turn in one direction when the first triac is fired and to turn in the reverse direction when the second triac is fired, the duty cycle of the motor being determined by the duration of the controller output signals applied to the triacs.

2. A system as set forth in claim 1, wherein said final control element is a valve which is opened or closed by said motor to vary said process variable accordingly.

3. A system as set forth in claim 1, wherein said motor is an alternating-current motor having a current rating in excess of one ampere and a voltage rating of at least 200 volts.

4. A system as set forth in claim 1, wherein said motor is a direct-current motor and said booster includes rectifying elements in series with said triacs.

5. A system as set forth in claim 1, wherein said booster includes respective trigger diodes coupled to said first and second triacs, which trigger diodes are responsive to said first and second output signals from said controller to fire said triacs.

6. A system as set forth in claim 5, wherein said booster includes a selector switch for manual or automatic operation of the motor, the selector switch in the manual mode coupling said motor to push-button switches for controlling the motor direction, the selector switch in the automatic mode coupling said booster to said controller.

7. A system as set forth in claim 5, further including at least one additional pair of triacs shunted across said main triacs to increase the current capacity of the booster.

8. A system as set forth in claim 5, further including a triggering oscillator operatively coupled to each triggering diode.

9. A system as set forth in claim 7, wherein an isolation pulse transformer is interposed between each triggering oscillator and its associated triggering diode.

* * * * *